Feb. 1, 1944. G. J. OSWALD ET AL 2,340,680

ELECTRIC WELDING

Filed Feb. 25, 1941

George J. Oswald and
David I. Cronin
Inventors

By Earl Beust

Their Attorney

Patented Feb. 1, 1944

2,340,680

UNITED STATES PATENT OFFICE 2,340,680

ELECTRIC WELDING

George J. Oswald and David L. Cronin, Dayton, Ohio, assignors to The National Cash Register Company, Dayton, Ohio, a corporation of Maryland Application February 25, 1941, Serial No. 380,523

6 Claims. (Cl. 219—17)

This invention relates to means and a method or process for electrically welding objects to the backs of finished or highly-polished relatively thin metal surfaces without marring the prepared surface by heat or pressure marks.

In electric spot welding practice as hithterto known, the electrodes are pressed against the opposite outside surfaces of two superimposed objects and current passed through both objects, with the result that the outer sides of both objects are marked by heat and pressure, the pressure marks being caused by the necessarily small area of the electrodes and the heat marks being caused by the current passing through the four surfaces. This invention discloses a method in which the electrodes are placed side by side on the object to be fixed to the back of the object with the finished surface, whereby the heat caused by the current flowing from one electrode to the other passes through the contacting surfaces of the two objects without passing through the said finished or polished surface, the finished or polished surface being placed upon a contour-conforming, highly-polished electrically non-conductive and heat-conductive surface as a foundation or bed for the work. In this manner, by preventing the welding current from passing clear through both objects and consequently through the finished or polished surface, heat marks are avoided thereon, and, the entire finished or polished surface being in contact with the highly-polished foundation or bed, the total pressure required to hold the materials in welding contact is distributed over a large area of the finished or polished surface, and no localizing pressure marks are made.

Therefore, the principal object of this invention is to provide a process for electrically welding objects to the back of another object having a finished or polished surface on its front side.

Another object of the invention is to provide a process for electrically welding one object to another, whereby the current does not flow completely through both surfaces of both objects.

Another object of the invention is to provide a method for electrically welding an article to the back of an object having a finished or polished surface on its front side, in which method the polished surface is caused to rest on another polished foundation surface of equal area so as to distribute the localized welding pressure required over the entire finished surface area, thereby preventing localized pressure marks on the said surface.

Another object of the invention is to provide a process for welding two objects together whereby the obverse side of one object is spot welded to the reverse side of another object by placing one of the electrodes on the reverse side of one object and the other electrode on the reverse side of the second object.

An object of the invention is to provide a method for welding the obverse side of one object to the reverse side of another object whereby the electrodes are both placed on the reverse side of the first-mentioned object.

With these and incidental objects in view, the invention includes other novel features, the essential elements of which are set forth in appended claims and a preferred form or embodiment of which is hereinafter described with reference to the drawing which accompanies and forms a part of this specification.

*General description*

Figure 1:
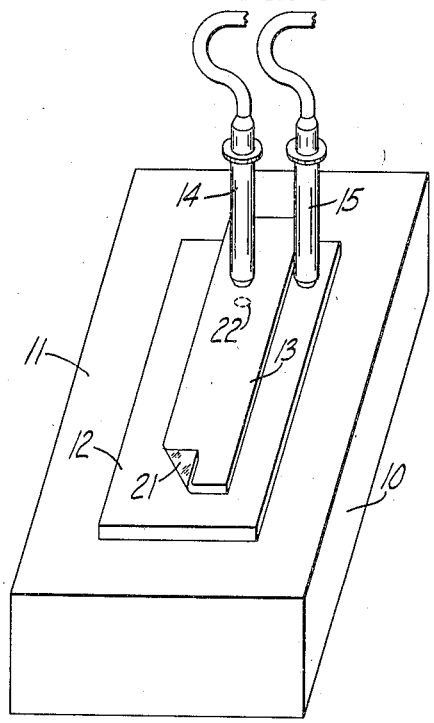
Fig. 1 shows the method of placement of the objects to be welded on a bed or foundation, and the placement of one of the electrodes on the reverse side of one object and the other electrode on the reverse side of the other object.
Figure 2:
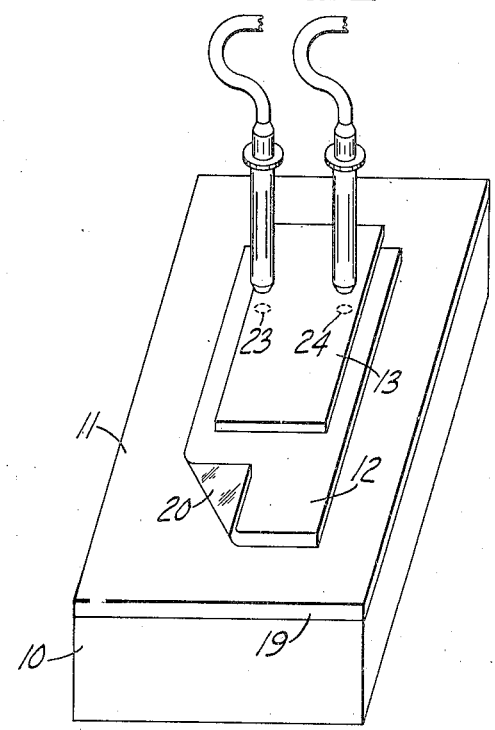
Fig. 2 shows the alternative method of the placement of the electrodes, wherein both electrodes are placed on the reverse side of one of the objects, and shows a foundation with an electrically non-conductive and heat-conductive coating for the supporting surface.
Figure 3:
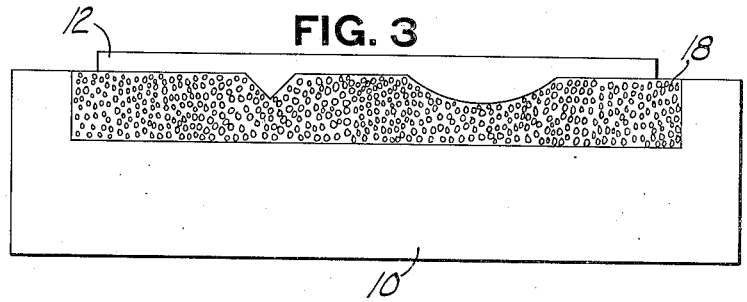
Fig. 3 shows a plate with an irregular surface and a conforming bed to support the plate.

A bed or foundation 10 (Figs. 1, 2, and 3) is provided on which to place the work. This block or foundation is preferably of a hard electrically non-conductive material having its working or top surface 11 smooth or highly polished (Figs. 1 and 2). To accommodate other than plane surfaces, its surface may be shaped to conform to the contours of the polished object to be placed thereon. Another method of supporting regular or irregular surfaces is shown in Fig. 3, wherein a plastic bed 18 is provided, made of a heat-resisting plastic material or other conforming electric insulator. It is the function of the novel foundation to form a non-marring smooth resting surface for the entire prepared face of the object to be placed thereon. Suggested materials for making an electrically non-conductive, hard, conforming, smooth surface for the support or foundation are granite in a solid piece as represented by Fig. 1, or a mica sheet backed by a strong support such as steel, or a steel plate coated with ceramic material or a porcelain enamel, such coatings being designated 19 (Fig. 2). Other electrically non-conductive solids that will take a polish or can otherwise be made smooth and will stand the necessary welding pressures are also suitable. It is preferable that the material of which the support or foundation is built be a good conductor of heat, so as to keep the prepared surface of the object placed thereon from becoming excessively hot beneath the welded spot.

The prepared work object 12 (Figs. 1, 2, and 3) is shown placed with the prepared surface 20 (Fig. 2) next to the foundation surface 11. The object 13, to be welded, is placed with the surface 21 in contact with the reverse side of the object 12. It is recommended that the reverse surface of object 12 and the obverse and reverse surface 21 (Fig. 1) of object 13 be made clean and smooth, as in proper welding practice, so that the electrodes and the electrically-conductive surfaces make a proper contact.

Two methods of placing the electrodes are shown. In the first method, one electrode 14 (Fig. 1) is placed on the reverse side of object 13 and the other electrode 15 is placed on the reverse side of object 12. In this method of placement, with the use of the proper current values, timing, and pressure, the object 13 may be spot welded to the object 12 at a point directly beneath electrode 14, as indicated by the dotted circle 22. In the use of this method, the current flows from electrode to electrode along the reverse surface of object 12 and through object 13. Though the polished obverse surface 20 (Fig. 2) of object 12 has no current passing therethrough, it is heated somewhat by conduction from the heated parts of object 12, which heat, by proper selection of time and current values suitable to the material, is dissipated by the heat-conductive bed 10 or surface 19 before it may make a heat blemish on the prepared surface.

Fig. 2 shows the other method of placing the electrodes, wherein electrode 14 and electrode 15 are placed on the reverse side of object 13 in close proximity and the current is passed between the electrodes in such quantity that the path of the current extends into the object 12, causing spot welding at the points 23 and 24, shown by dotted lines.

Depending upon the thickness of the two objects, the electrodes are placed as close together as possible. The thinner the objects, the closer the electrodes must be to one another to prevent penetration of the current to the polished obverse surface 20 of object 12.

In the example shown in Fig. 1, only enough pressure must be made with electrode 15 to cause good electrical contact, whereas enough pressure must be made with electrode 14 to cause the desired size of spot weld, thereby preventing marring the prepared piece 12. As the thickness of the objects, the material of which the objects are made, and the size of the weld desired are variable factors, the statements given concerning the current, the pressure, and the time must be generalized, as they are matters of adjustment, and those skilled in the art may make these adjustments to suit the work to be done.

The methods disclosed herein are also applicable to the welding of any thin bodies, whether having prepared surfaces or not, where it is desirable not to distort them with pressure marks.

As a specific example of the values of time and current suggested for spot welding sheet steel .020 of an inch thick to the back of a sheet of stainless steel .060 of an inch thick, finished by polishing on its front surface, it has been found that 60 pounds' pressure applied through a welding electrode such as electrode 14 (Fig. 1), which has a diameter at the contact of one-third of an inch, at an electric potential of about six volts applied for one-sixtieth of a second will make a satisfactory spot weld without disturbing the said finished surface.

While the structure and process herein shown and described are admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. A support for work material to be electrically welded, said support consisting of a piece of rigid backing material having a surface coating of electrically non-conducting, heat-conducting material thereon conforming in contour and smoothness to a work material surface placed in contact therewith, to prevent the marring of the work material surface when a weld is made.

2. A support for work material to be electrically welded, said support comprising a piece of steel having applied thereto a supporting surface of mica conforming in contour and smoothness to the applied surface of the work material to prevent mechanical marring of the supported surface and to prevent electric current from flowing between the work material and the support.

3. A support for work material to be electrically welded, said support consisting of a solid base having thereon a coating of ceramic material having a surface smoothness equal to and contours conforming to the applied surface of the work material to prevent marring of the supported surface when a weld is made.

4. A support for work material to be electrically welded, said support consisting of a rigid metallic base having thereon a coating of ceramic material having a surface smoothness equal to and contours conforming to the applied surface of the work material to prevent marring of the work material surface by pressure, heat, or the passage of electric current between the work material and the support when a weld is made.

5. A support for work material to be electrically welded, said support consisting of a rigid base having thereon a coating of porcelain which conforms in smoothness and contour to the applied surface of the work material to prevent marring of the applied surface by pressure, heat, or the passage of electric current between the work material and the support when the weld is made.

6. A support for work material to be electrically welded, said support consisting of a steel plate coated with a hard, smooth, electrically-non-conducting layer of porcelain.

GEORGE J. OSWALD.
DAVID I. CRONIN.